United States Patent
O'Brien et al.

(10) Patent No.: US 6,767,155 B2
(45) Date of Patent: Jul. 27, 2004

(54) HIGH STABILITY LATCH MECHANISM

(75) Inventors: Michael J. O'Brien, Rochester, NY (US); Calvin E. Abplanalp, Fairport, NY (US); Richard A. Colleluori, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 10/117,256

(22) Filed: Apr. 5, 2002

(65) Prior Publication Data

US 2003/0190184 A1 Oct. 9, 2003

(51) Int. Cl.$^7$ ................................................ F16B 21/00
(52) U.S. Cl. .................... 403/322.1; 403/321; 403/326; 403/330; 244/161; 244/158 R
(58) Field of Search ............................. 403/321, 322.1, 403/322.3, 322.4, 323, 325–327, 330, 49; 244/161, 158 R; 292/304, 341.16, 25, 27, 201; 901/38, 39; 294/100, 101, 87.26, 87.24, 94, 116, 86.22, 86.24, 86.25

(56) References Cited

U.S. PATENT DOCUMENTS

| | | | | |
|---|---|---|---|---|
| 422,739 A | * | 3/1890 | Darmstadt | .................... 292/25 |
| 4,368,913 A | * | 1/1983 | Brockmann et al. | ........ 294/106 |
| 4,431,333 A | | 2/1984 | Chandler | |
| 4,508,296 A | | 4/1985 | Clark | |
| 4,607,815 A | * | 8/1986 | Turci et al. | .................. 244/161 |
| 4,682,804 A | | 7/1987 | Palmer et al. | |
| 4,905,938 A | * | 3/1990 | Braccio et al. | ............. 244/161 |

* cited by examiner

Primary Examiner—Gregory J. Binda
Assistant Examiner—Michael P. Ferguson
(74) Attorney, Agent, or Firm—Stephen H. Shaw (57) ABSTRACT

A high stability ball-in-cone type latch mechanism is taught that is particularly useful for large deployable optical systems. It provides a nearly perfect kinematic mount between structural or optical elements and can easily be remotely controlled. The latching device comprises a latch core; at least one coupler link having a pawl at a first end thereof and a cam follower at a second end thereof, the at least one coupler link pivotally connected to follower link, the follower link being pivotally connected to the latch core; a bearing housing affixed to the latch core; a spherical bearing residing in the bearing housing, the spherical bearing having a ball stem extending therefrom through the bearing housing; a lead screw connected to the ball stem; a drive cam threadably engaged on the lead screw, the cam follower engaging the drive cam; and a motor to drive rotation of the lead screw to control travel of the cam on the lead screw thereby causing the at least one coupler link to move from an open position to a clamping position.

12 Claims, 10 Drawing Sheets

HIGH STABILITY LATCH MECHANISM

FIELD OF THE INVENTION

This invention relates generally to actuated mechanical interlock mechanisms and, more particularly, to high stability latching of deployable optical metering structures.

BACKGROUND OF THE INVENTION

To extend the range of astronomical telescopes, it is necessary to increase the effective aperture. This implies that larger diameter primary mirrors must be employed. Unfortunately, the current state of the art is at the practical size limit of monolithic mirrors. As a result, segmented primary mirrors comprising a plurality of petals surrounding a monolithic center segment must be devised. A space born telescope of this configuration will require deployment after being placed in orbit. Linear, stable, high stiffness precision latches must be used to interlock the metering structure once the mirror is deployed to maintain mirror performance. Current latching technology does not address the need for high stiffness, linearity, and precision. Latch technology as used in satellite antennae does not meet optical tolerance requirements. Their repeatability and stability are typically two orders of magnitude below optical system requirements.

Latching mechanisms commonly found can be categorized either as a retaining type or a mating type. Retaining types are preset in the latched position and release in their operating state. Examples of this type are illustrated in U.S. Pat. No. 4,682,804 to Palmer, et al. and U.S. Pat. No. 4,508,296 to Clark. These devices are used to retain payloads during transport, preventing damage due to shock and vibration. Remote release of the latch allows the payload to be removed from the support structure. High reliability and preload are their key performance requirements.

Mating type latching mechanisms are illustrated in U.S. Pat. No. 4,431,333 to Chandler and U.S. Pat. No. 4,905,938 to Braccio et al., 1990. These devices have male couplings that mate with female sockets. Latching occurs after the halves are mated and serve to connect two bodies after contact. These are used to grapple satellites for repair or connection of trusses where only low tolerance alignment is necessary. Again no consideration is given to dynamic performance of the connection.

SUMMARY OF THE INVENTION

It is therefore an object of the present invention to provide a linear, stable, high stiffness precision latch mechanism.

It is a further object of the present invention to provide a precision latch mechanism with high repeatability and stability.

Yet another object of the present invention is to provide a latch mechanism for use in the deployment of a segmented primary mirror comprising a plurality of petals surrounding a monolithic center segment.

Still another object of the present invention is to provide a precision latch mechanism that can be used to interlock the metering structure of a segmented mirror once the mirror is deployed to thereby maintain mirror performance.

Briefly stated, the foregoing and numerous other features, objects and advantages of the present invention will become readily apparent upon review of the detailed description, claims and drawings set forth herein. These features, objects and advantages are accomplished by providing a high stability ball-in-cone type latch mechanism designed specifically for large deployable optical systems. It provides a nearly perfect kinematic mount between structural or optical elements and can easily be remotely controlled. Clamping force and drive position feedback can be incorporated to allow controlled closure and continuous force monitoring during and after clamping. When in the closed position, the interface consists of a ball captured between two conical surfaces. A flexured ball and floating clamp plate is typically attached to the structure being deployed. The latch base is equipped with a conical seat to accept the ball, and three clamp fingers to grip the floating clamp plate once the ball is seated in the socket. A lead screw driven axial cam serves to drive the clamping mechanism into both a clamped and a retracted position. A four bar linkage is formed by the latch cam, coupler link, follower link, and seat. Once the follower link is grounded on the seat, the coupler link acts as a simple lever applying force to the clamp plate. Advantage is taken of the relatively large motion available from a four bar mechanism, as well as the mechanical advantage of a simple lever once latching is initiated. Large clamping forces generated at the interface by the coupler are reacted at the seat thereby providing high interface stiffness and linearity. No latching forces are transferred to the optical support structure. High interface clamping forces on the order of 1000 lbs. can be achieved with low input torque at the lead screw by choosing appropriate cam angles. Employing a flat cam area at the end of travel eliminates the need for accurate final cam position. Choosing appropriate materials can eliminate thermally induced force variation. End mounting the lead screw in the latch seat with a spherical bearing compensates for part tolerances, equalizing clamp finger force during latching. Limit sensors at extremes of cam travel and strain gauges on clamp arms can be provided to monitor operation during the latching procedure.

BRIEF DESCRIPTION OF THE DRAWINGS

To facilitate understanding, identical reference numerals have been used, where possible, to designate identical elements that are common to the figures.

DETAILED DESCRIPTION OF THE INVENTION

Figure 1:
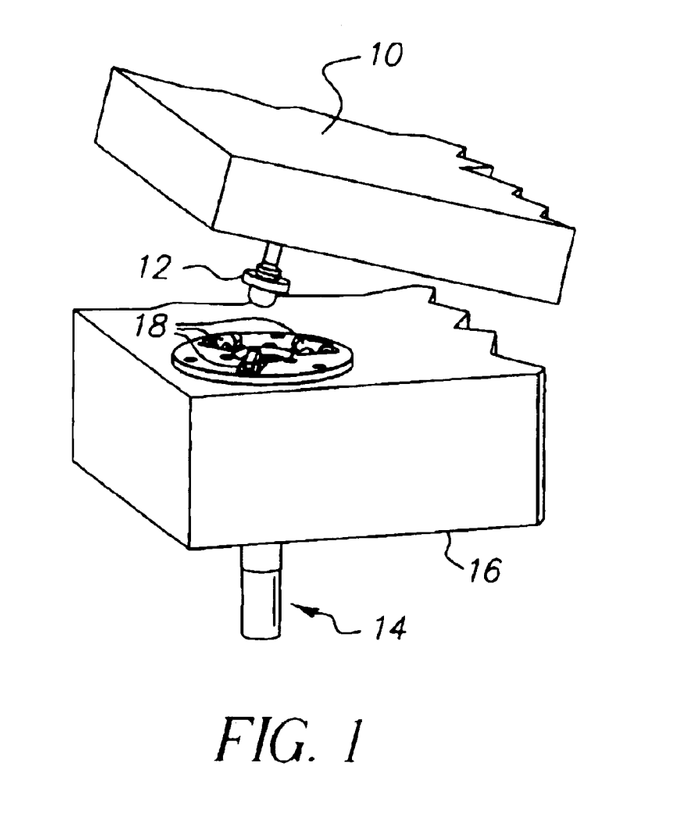
FIGS. 1, 2 and 3 are perspective illustrations of the latching sequence of the latch mechanism of the present invention in conjunction with an exemplary deployed member and an exemplary reference structure.
Figure 2:
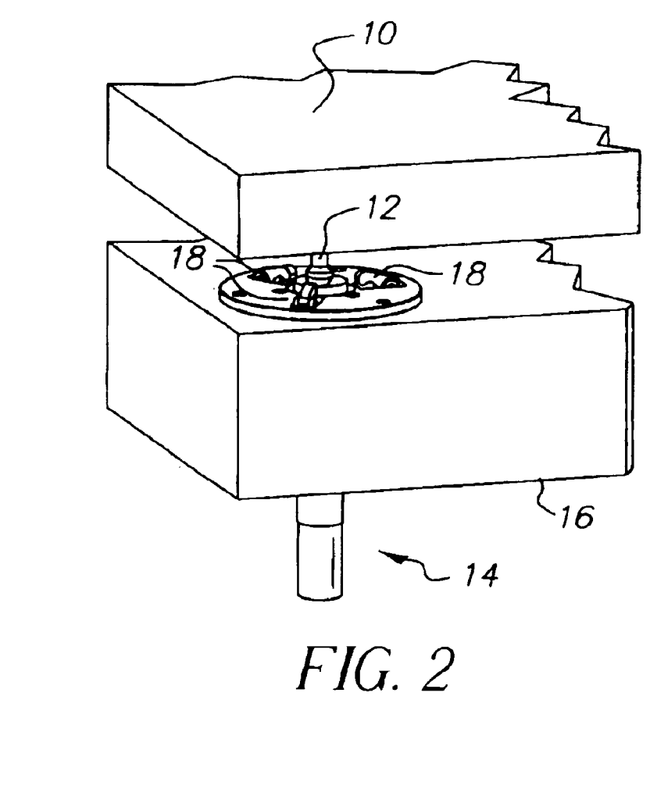
Figure 3:
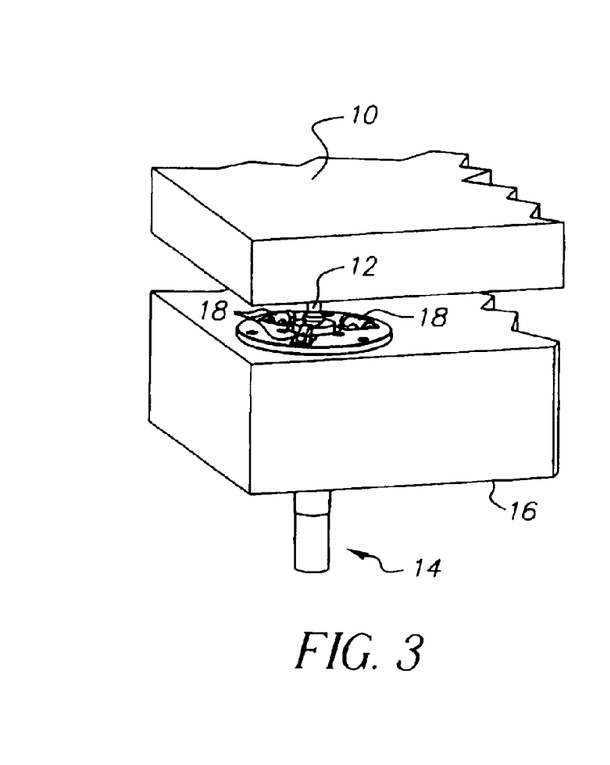

Referring to FIGS. 1 through 3 there are three distinct stages which occur during the deployment operation in a large optical system. A single corner of a typical deployed optical system is illustrated in FIGS. 1 through 3. During the first stage as illustrated in FIG. 1, the deployed member 10 has attached to it a flexured ball assembly 12. The flexured ball assembly 12 (shown in greater detail in FIGS. 4 and 8) is in alignment with the latch mechanism 14 (shown in greater detail in FIGS. 4, 5 and 10) which is mounted in the reference structure 16. Any number of common methods can be used to maintain axial alignment. Latching pawls 18 are driven to their open position, providing clearance for the approaching flexured ball assembly 12. As deployment proceeds, the flexured ball assembly 12, makes contact with the latch mechanism 14 as shown in FIG. 2. Position sensing of the deployed member 10 is generally provided by an external system (not shown), and indicates when the flexured ball assembly 12, is in its mated position with latch mechanism 14. At this point the latch mechanism 14 is actuated, which causes the latching pawls 18 to engage the flexured ball assembly 12, as illustrated in FIG. 3. Applying a large force, typically about 1000 pounds, to seat the ball assembly 12 completes the latching operation.

Figure 4:
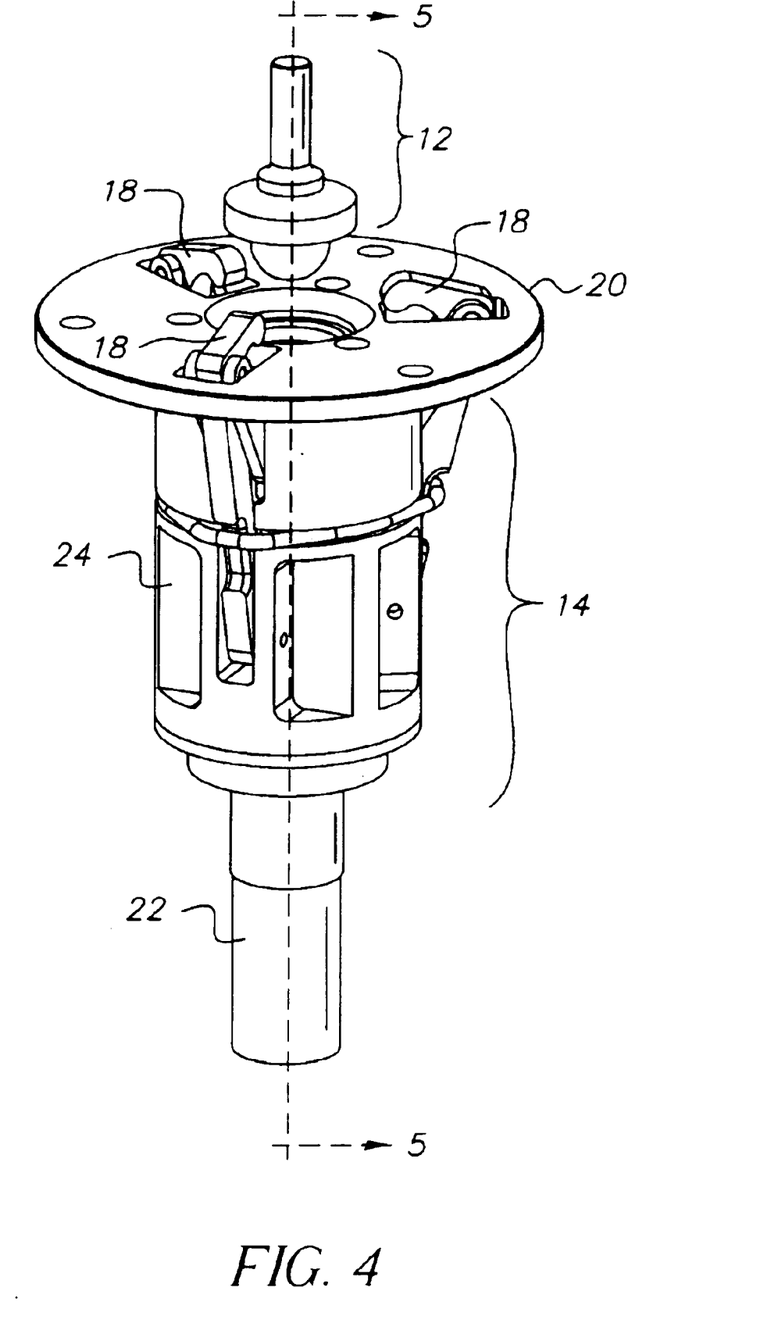
FIG. 4 is a perspective view of the latch and flexured ball assembly removed from the exemplary deployed member and the exemplary reference structure shown in FIGS. 1 through 3.

Turning to FIG. 4 there is shown more detailed views of the latch 14 and flexured ball assembly 12 removed from their respective structures 10, 16. Mounting plate 20 serves as the interface between the latch 14 and the reference structure 16 to which it is mounted. Drive motor 22 moves the latching pawls 18 in or out and supplies clamping force when the latching pawls 18 are in the latched state. The latch mechanism 14 is capable of locking the pawls 18 tightly in an open position as well as applying a large clamping force when the latching pawls 18 are in the fully latched position. The latching pawls 18 are supported within a main housing 24 to which mounting plate 20 is mounted.

Figure 5:
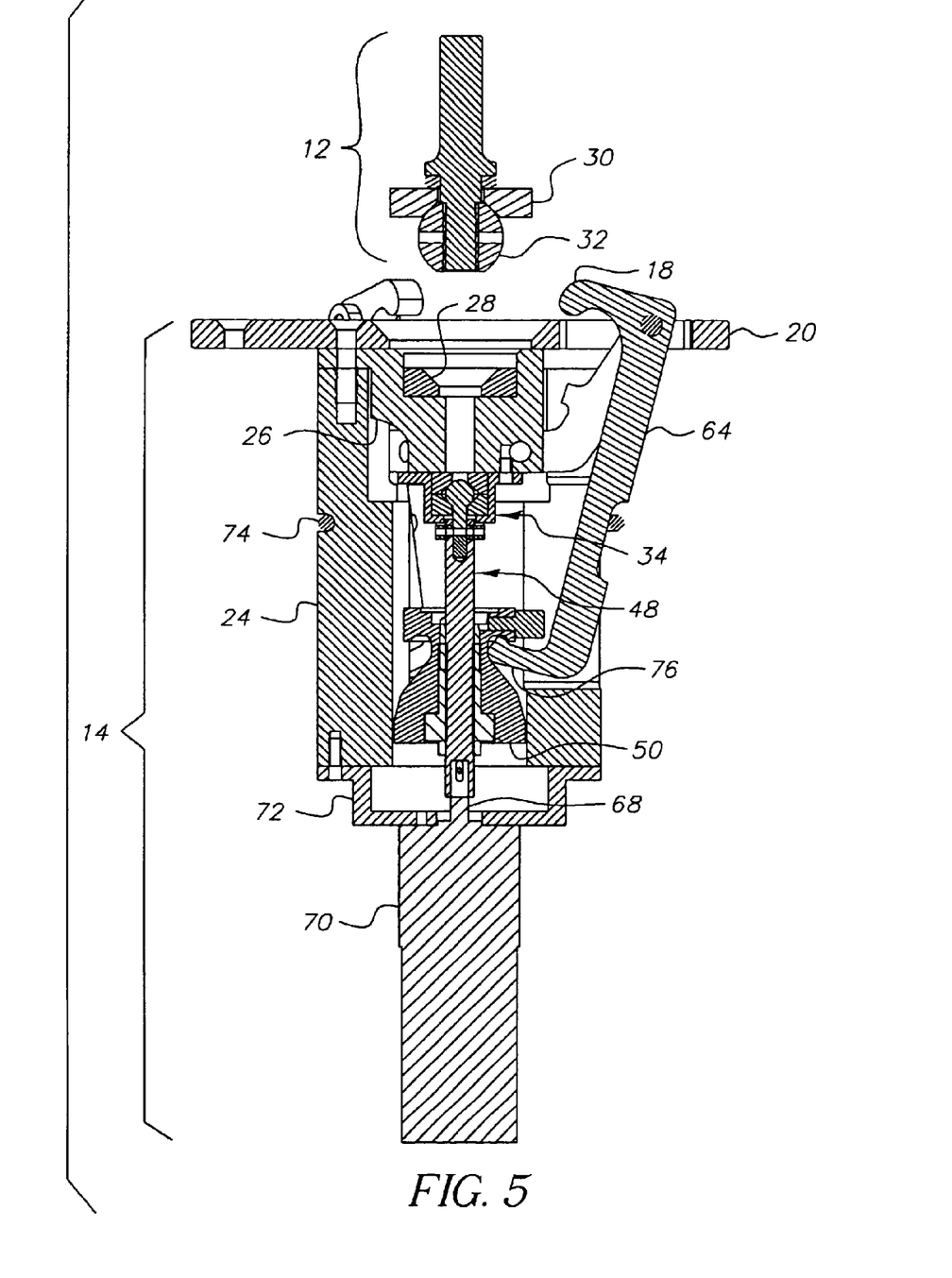
FIG. 5 is a cross-sectional view of the latch mechanism and flexured ball assembly taken along line 5—5 of FIG. 4.

Referring next to FIG. 5 there is shown a cross-sectional view of the latch mechanism 14 and flexured ball assembly 12 taken along line 5—5 of FIG. 4. Residing within and attached to main housing 24 is latch core 26 which provides the clamping force reaction structure. The joint stiffness relative to the structure is controlled by the interface stiffness of mount plate 20. The actual latch stiffness is controlled by the interface characteristics of the ball seat 28, clamp plate 30, and ball 32. Consequently, the latch mechanism 14 and flexured ball assembly 12 are generally made of a hard material. Although FIG. 5 shows the mount plate 20, latch core 26, and ball seat 28 as separate elements, those skilled in the art will recognize that it is possible to combine them into a single component to reduce part count and increase stiffness.

Figure 6:
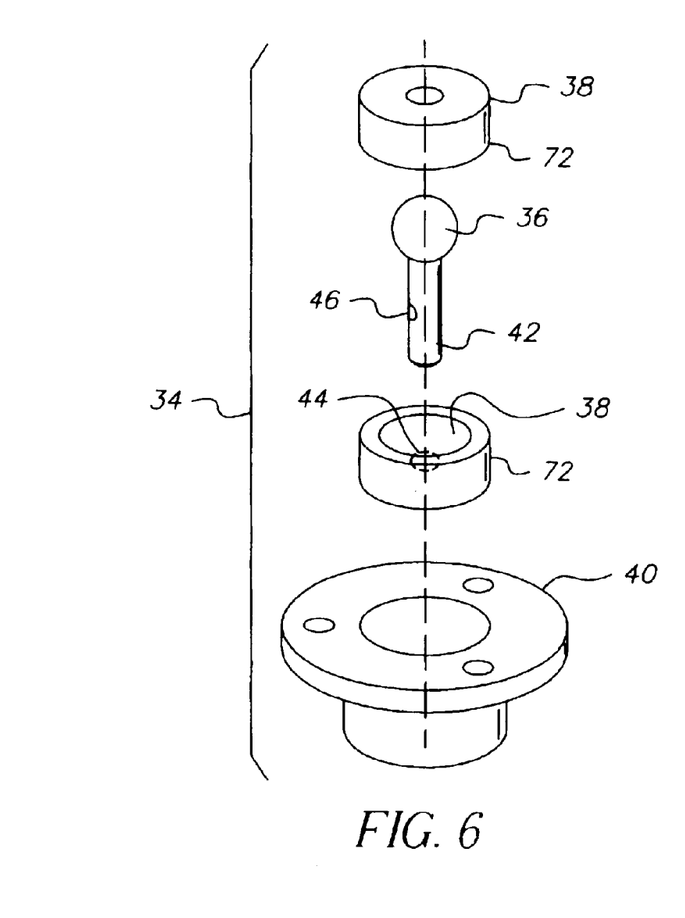
FIG. 6 is an exploded perspective view of the spherical bearing assembly.

Still referring to FIG. 5, there is a spherical bearing assembly 34 (shown in an exploded view in FIG. 6) attached to the latch core 26. The spherical bearing assembly 34 is comprised of a spherical bearing 36, bearing cups 38, and bearing housing 40. The geometry of bearing cups 38 is such that when bearing housing 40 is mounted on the base of the latch core 26 (see FIG. 5), bearing cups 38 provide a running fit with the spherical bearing 36. Ball stem 42 extends through an axial bore 44 in the lower bearing cup 38 and through an opening in the bearing housing 40. The axial bore 44 is sized (larger than diameter of ball stem 42) to allow up to 15° of tilt on the ball stem 42. A radial bore 46 is provided through ball stem 42 to allow for connection to the lead screw/cam assembly 48 (shown in exploded detail in FIG. 7). Material selection for the bearing cups 38 (typically hardened 440c stainless steel) must be different from spherical bearing 36 material (typically hardened M6 tool steel) to prevent micro welding at the contact area which can occur if lubricant migrates. Solid lubricants or low friction coatings may also be used on the contacting surfaces.

Figure 7:
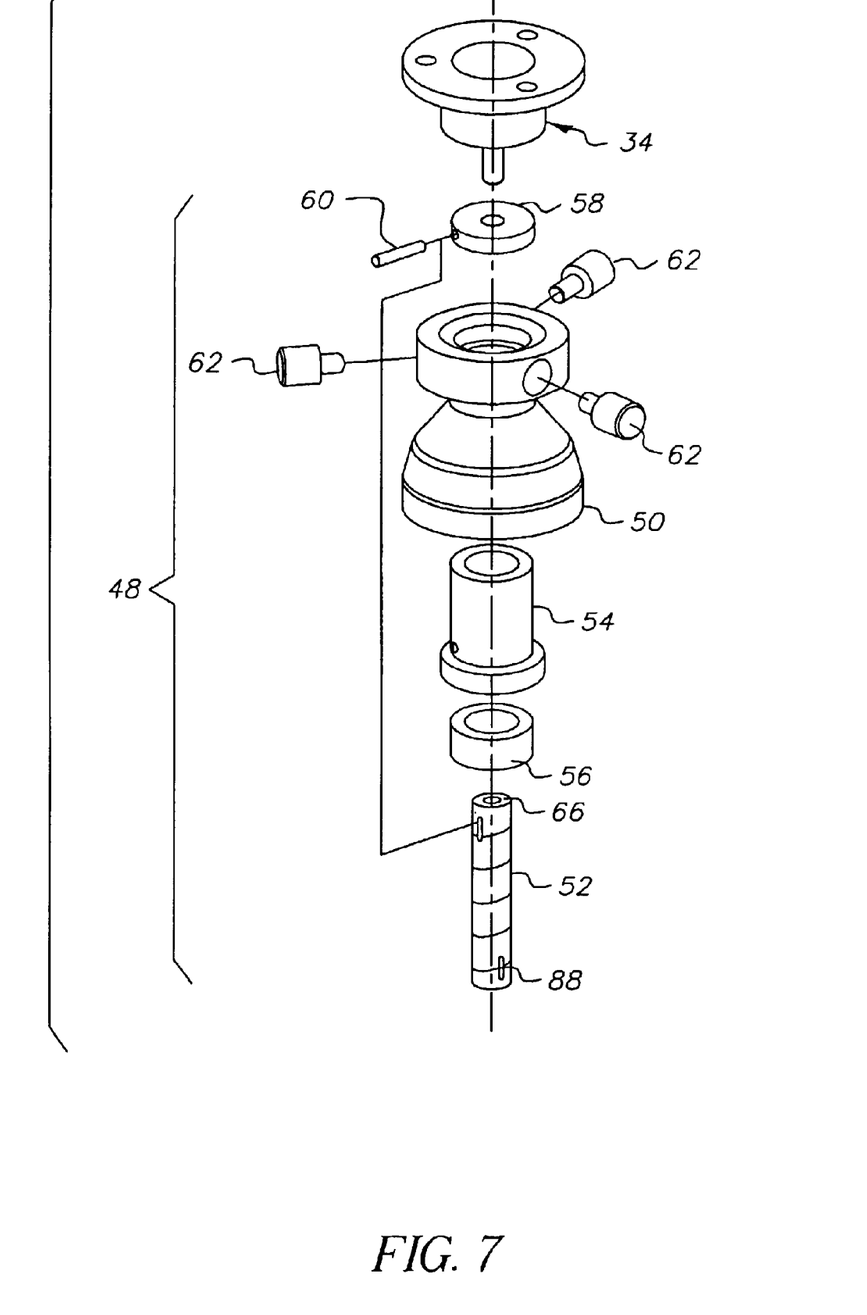
FIG. 7 is an exploded perspective view of the lead screw/cam assembly.

The lead screw/cam assembly 48 is comprised of drive cam 50, lead screw 52, cam insert 54, lower cam stop 56, upper cam stop 58, cam stop pin 60, and anti-rotation pins 62. The cam insert 54 is preferably a hardened steel material threaded to mate with the lead screw 52 that is preferably made of hardened stainless steel. A fine pitch thread, typically ¼–80, is employed to provide great mechanical advantage and axial load bearing capabilities. The fine pitch thread provides a "low ramp" adjustment of the mechanism. The resultant large number of threads also provides for increased mechanical engagement with the nut (cam insert) and therefore, a higher load capability. Other threads may be used based on available motor torque, link geometry, and required clamping force. Optimization methods for these mechanisms are well known in the art. Cam insert 54 is press fit into drive cam 50 and may be pinned if required for higher latch loads. Cam material can be of any dissimilar metal from the coupler links 64 from which pawls 18 extend. For lubricated interfaces, red brass or titanium is used. Similar materials for the drive cam 50 and coupler links 64 may be employed if low friction coatings are applied to mating surfaces. Lower cam stop 56 is internally threaded to match the thread of lead screw 52. Lower cam stop 56 is positioned on the lower end of lead screw 52 to serve as a limit or travel stop for drive cam 50 when the latch is in the full open state. Once properly located, lower cam stop 56 is pinned in place to prevent axial movement when contacted. Upper cam stop 58 also has internal screw threads to match lead screw 52 and is positioned on the upper end to serve an upper limit or travel stop for drive cam 50. Cam stop pin 60 serves to lock upper cam stop 58 in place and lock ball stem 42 of the spherical bearing assembly 34 into the end bore 66 on the lead screw 52. The drive cam 50 is kept from rotating as the lead screw 52 turns via three anti-rotation pins 62 that engage the main housing 24. Since the anti-rotation pins 62 encounter low forces, they may be made from a material dissimilar to the main housing 24, or a low friction surface treatment may be employed.

Lead screw 52 extends through drive cam 50. The bottom of the lead screw 52 interfaces with or is otherwise coupled to the drive shaft 68 of drive motor 70. Drive motor 70 is supported from motor mount 72 which is attached to the main housing 24. An inward radial force is applied to the coupler links 64 by a spring element 74, which is seated in a circumferential groove machined into the main housing 24. The main housing 24 also serves as an anti-rotation surface for the drive cam 50 and as a mounting surface for the motor mount 72. Lead screw/cam assembly 48 resides inside of main housing 24 and attaches to the spherical bearing assembly 34. Drive cam 50 engages the actuating arms 76 of coupler links 64 to operate the latch.

Figure 8:
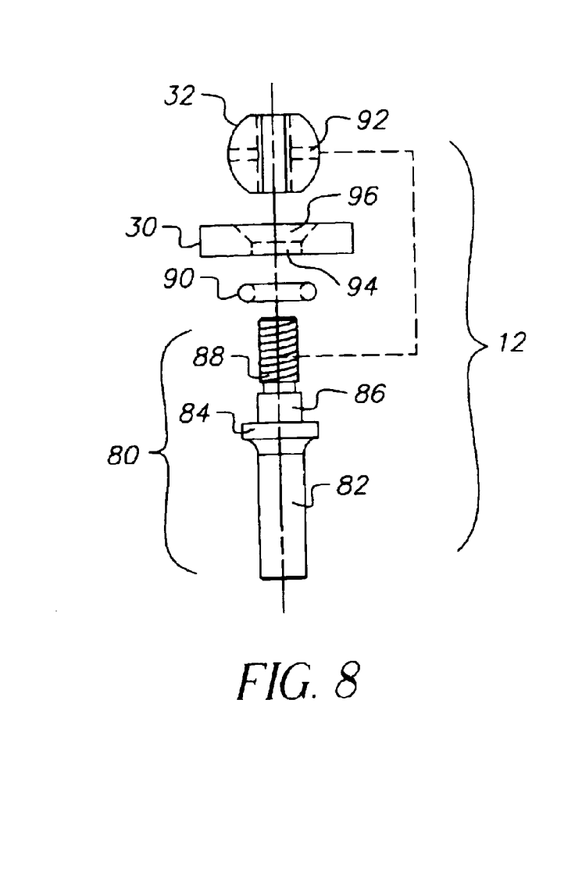
FIG. 8 is an exploded perspective view of the flexured ball assembly.

An exploded view of the flexured ball assembly 12 is shown in FIG. 8. The flexured ball assembly 12 comprises a flexured stem 80 including a cylindrical mounting shaft 82, a clamp plate retaining flange 84, a clamp plate centering shoulder 86, and a threaded shank 88. The cylindrical mounting shaft 82 is typically mounted in an interface block attached to a bipod flexure pair (not shown). Three such bipod flexure pairs constitute an arrangement well known in the art as a kinematic mount. O-ring 90 is placed on threaded shank 88 and moved down until it meets the clamp plate retaining flange 84. Clamp plate 30 is placed on the threaded shank 88 and also moved down to meet O-ring 90. Ball 32 is then threaded onto threaded shank 88 and is tightened against clamp plate centering shoulder 86. A diametrically located hole 92 is provided in ball 32 to allow the ball 32 to be pinned by drilling a hole through the threaded shank 88 after assembly. The geometry of the plate centering shoulder 86, clamp plate inner bore 94, clamp plate conical surface 96, and ball 32, is such that O-ring 90 is only slightly compressed, keeping the clamp plate 30 perpendicular to the axis of flexure stem 80, and clamp plate conical surface 96 in contact with the ball 32. Clamp plate inner bore 94 is slightly larger than centering shoulder 86 allowing the clamp plate 30 to tip about the axis with only a slight force on the edge of the clamp plate 30. This "floating clamp" feature prevents locking in strains due to deployment mechanism misalignment or part variations in the latch. Ball 32 and clamp plate 30 are preferably made from hardened 440c stainless steel since they define the clamped interface stiffness. Flexure stem 80 can be of any metal although a 400 series stainless steel is preferred.

Figure 9:
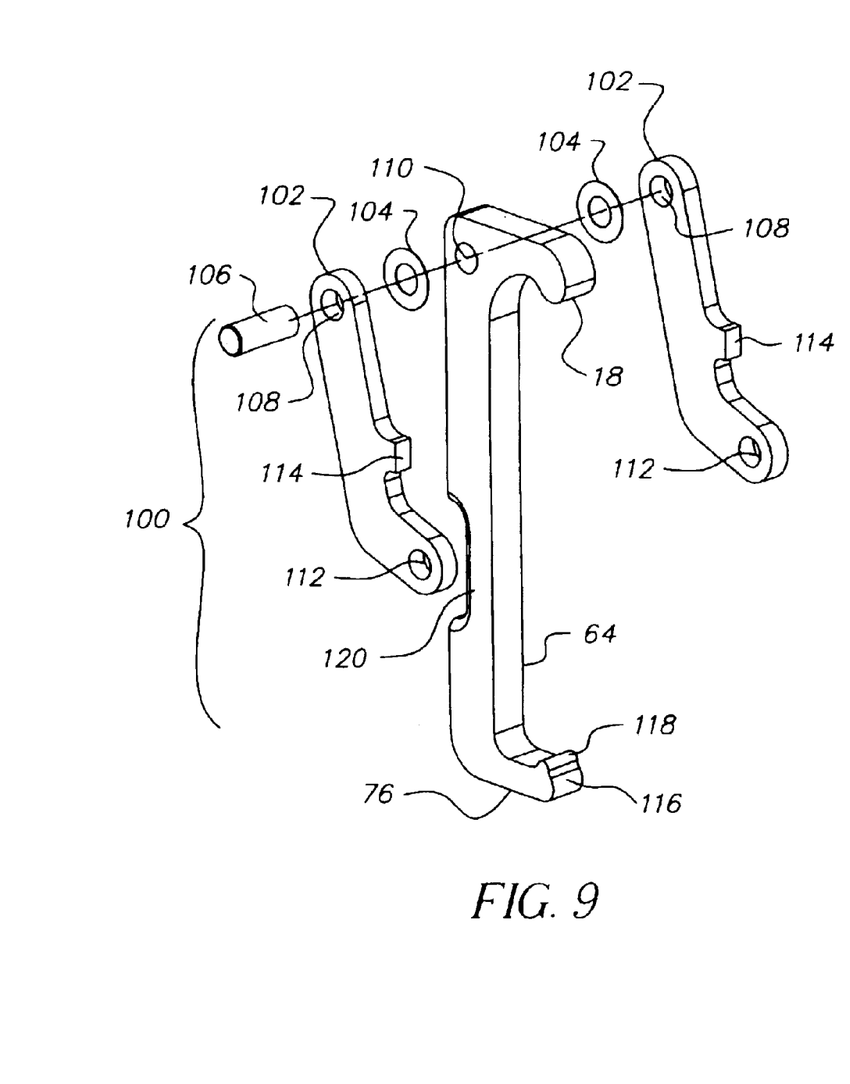
FIG. 9 is an exploded perspective view of the linkage assembly.

Each link 64 is part of a linkage assembly 100 shown in an exploded view in FIG. 9. Each linkage assembly 100 is comprised of a coupler link 64, follower links 102, spacers 104, and upper pivot pin 106. Upper pivot pin 106 inserts through bores 108 in follower links 102 and bore 110 in coupler link 64 as well as through spacers 104. Bores 108 in follower links 102 are sized to allow a press fit of upper pivot pin 106. Bore 110 in the coupler link 64 is sized as a running fit with upper pivot pin 106. Spacers 104 are made of 0.010 inch thick brass and serve to prevent binding of follower links 102 with coupler link 64 after assembly. High stresses in follower links 104 and coupler link 64 in the regions of the bores 108, 110 require these to be made of a high tensile strength material such as hardened 440c stainless steel. Similarly the pivot pin 106 is precision ground hardened tool steel. Lower pivot bores 112 must be aligned during assembly to allow kinematic stops 114 to properly interface with the latch core 26. Each coupler link 64 has a pawl 18 that applies force to the clamp plate 30. Each coupler link 64 forms a simple lever, where the lever arms are the distance from the center of the pivot bore 110 to the end of the respective pawl 18, and from the center of the pivot bore 110 to the cam follower 116 at the ends of actuating arms 76. Tab 118 is provided to allow the coupler links 64 to be drawn into the open position. A relief 120 in each coupler link 64 provides a pocket for residence of spring element 74, and allows the bending stiffness of the coupler link 64 to be controlled. The bending stiffness of coupler link 64 and the amount of deflection produced by cam 50 controls the force applied to the clamp plate 30.

Figure 10:
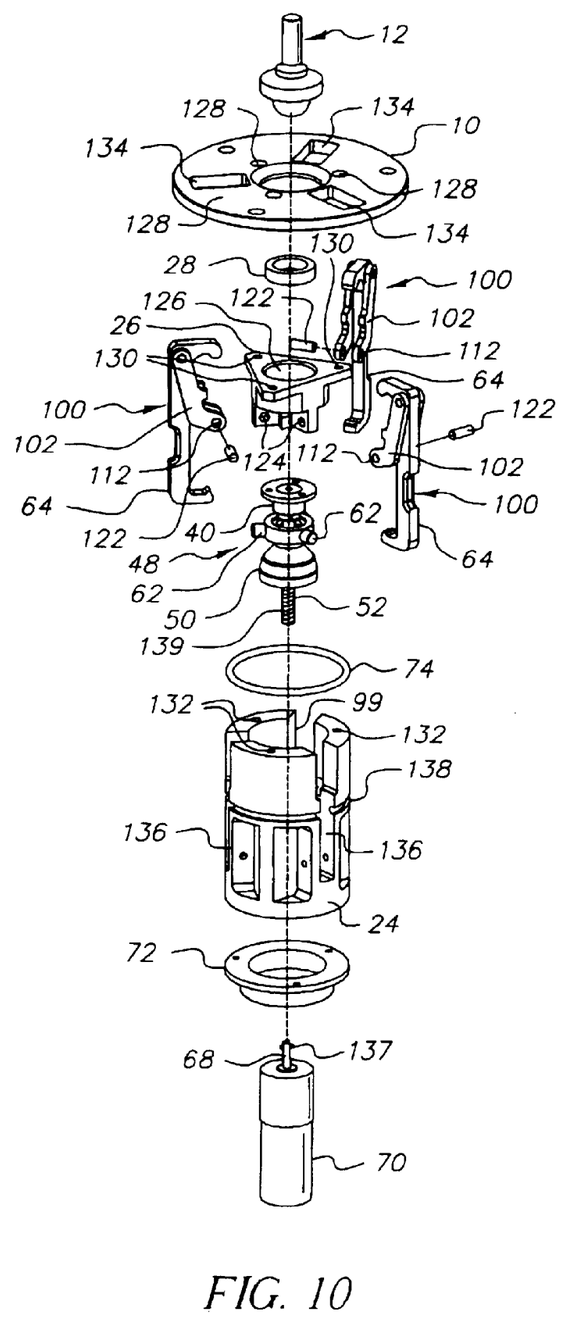
FIG. 10 is an exploded perspective view of the latch and flexured ball assembly of FIG. 4.

An exploded view of the complete latch of the present invention is shown in FIG. 10 to illustrate the final assembly procedure. Internal subassemblies including the linkage assemblies 100, lead screw/cam assembly 48, and ball seat 28 are assembled onto the latch core 26. Main pivot pins 122 are inserted through lower pivot holes 112 on the follower links 102 and main pivot holes 124 in the latch core 26. Lower pivot holes 112 on the follower links 102 are a running fit with the hardened base pins 122. Main pivot holes 124 in the latch core 26 provide a press fit for main pivot pins 122. Ball seat 28 is also press fit into the axial bore 126 of latch core 26. Clearance holes in the bearing housing 40 allow the lead screw/cam assembly 48 to be mounted to the bottom of the latch core 26 with screws. The assembled mechanism comprising the latch core 26 and ball seat 28, linkage assemblies 100, and lead screw/cam assembly 48, is then inserted into main housing 24. Mounting plate 20 is placed over the core assembly such that counter sunk screw holes 128 on the mounting plate 20 align with the clearance holes 130 on the latch core 26, which in turn align with tapped holes 132 in the main housing 24. Clearance slots 134 in the mounting plate 20 allow free movement of the linkage assemblies 100. Coupler links 102 are then pushed into lower clearance slots 136 in the main housing 24 until they contact the surface of drive cam 50. Spring element 74 (typically an O-ring) is then place around the main housing 24 to reside in a groove 138 therein to apply a radially inwardly directed force to the backs of coupler links 64. Lower clearance slots 136 allow for radial and tangential motion (actually rotational motion about spherical bearing 36) of each coupler link 64 within the main housing 24 due to tilting of the latch control mechanism, while the sides of lower clearance slots 136 provide a reaction surface for the anti-rotation pins 62. Motor mount 72 spaces the drive shaft 68 from the end of lead screw 52. Preferably, a drive pin 137 extending from drive shaft 68 fits loosely into a drive slot 139 in the lead screw 52 to allow angular motion at the spherical bearing 36. The entire clamping mechanism is allowed to float with in the main housing 26, allowing clamping to occur even if debris enters the system.

Figure 11A:
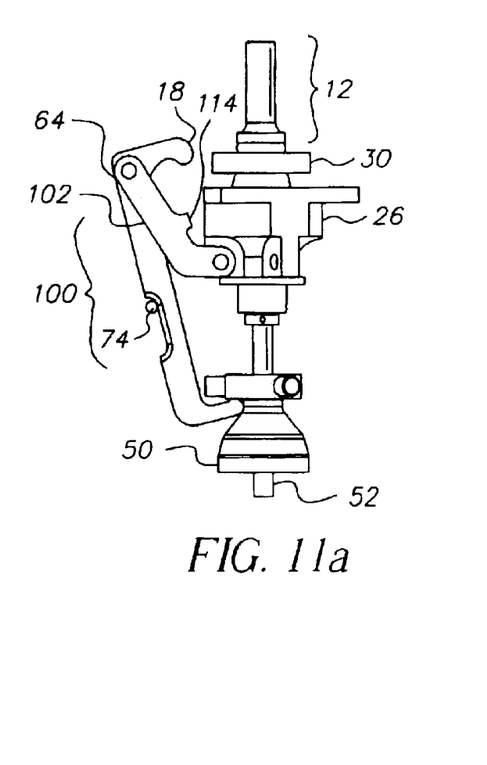
FIGS. 11a, 11b and 11c are simplified elevational views of the latch and flexured ball asssembly (showing only a single linkage assembly) illustrating the three basic kinematic stages of the latch operation.
Figure 11B:
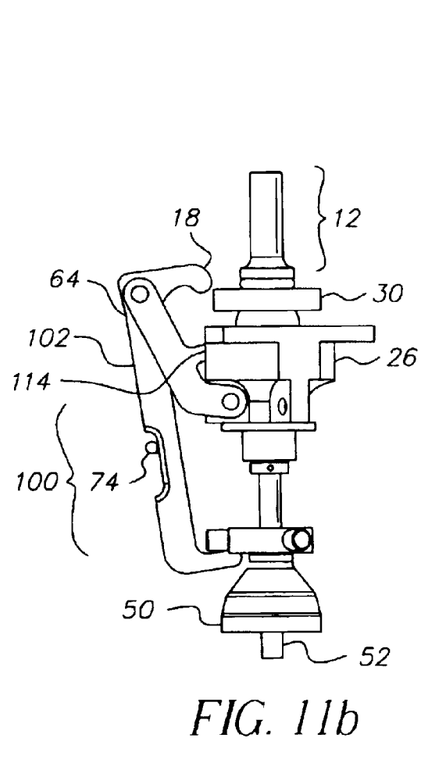
Figure 11C:
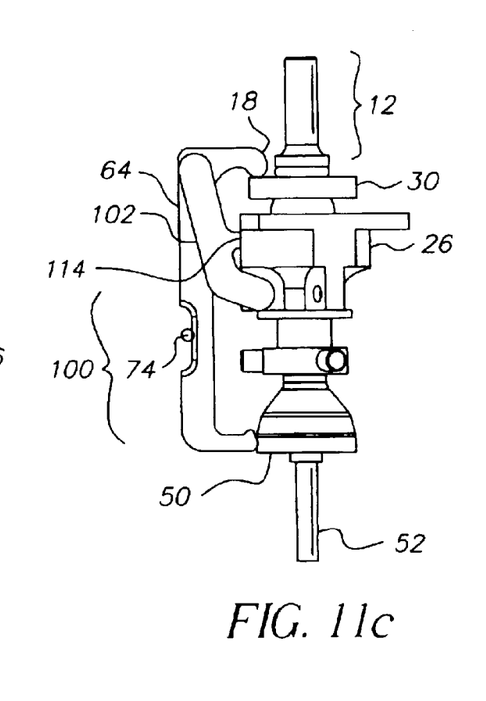

To better understand the functions of the individual latch parts, it is necessary to understand the basic kinematic stages of the latching operation. These are illustrated schematically in FIGS. 11a, b and c, by showing only one linkage assembly 100 on the latch core 26. It is assumed the flexured ball assembly 12 is seated in the latch core 26 when the latching operation begins. The first stage illustrated in FIG. 11a shows the pawl 18 in its widest position, allowing clamp plate 30 of the flexured ball assembly 12 to easily move into the latch. Drive cam 50 on the lead screw 52 pulls the coupler link 64 into its lowest position. Contact between the drive cam 50 and coupler link 64 is maintained by the inward force from spring 74. A four bar linkage is formed by the drive cam 50, lead screw 52, coupler link 64, and follower link 102 in this stage. In the second stage illustrated in FIG. 11b, drive cam 50 has moved up on lead screw 52 toward the latch core 26 allowing stops 114 of the follower link 102 to contact the latch core 26. At this point the clamp plate 30 is considered captured. Although no force is being applied, the flexured ball assembly 12 cannot move out of the capture range of the latch. Grounding stop 114 of the follower link 102 on the latch core 26 degenerates the four bar linkage into a simple lever that is activated by the drive cam 50. The end of the third stage of the latching process is illustrated in FIG. 11c. Here the drive cam 50 has moved up to its final position on the lead screw 52. Movement of the coupler link 64 along the drive cam 50 initiates contact of pawl 18 with the clamp ring 30 and applies the full clamping force.

Figure 12A:
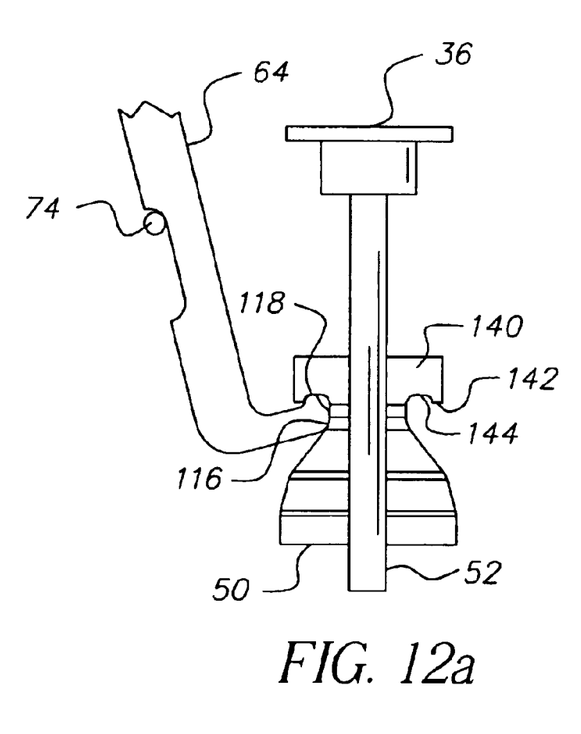
FIGS. 12a, 12b, 12c, 12d, and 12e are simplified side elevational views of the lead screw/cam assembly in combination with a single coupler link illustrating cam/follower relationship for the five phases of the latching operation.

Drive cam 50 is designed to have five distinct operating regions as illustrated in FIGS. 12a, b, c, d, e. The first state is shown schematically in FIG. 12a where coupler link 64 is fully retracted, putting the latch in its open position. The top of drive cam 50 is equipped with a flange 140 having a lip 142 that prevents tab 118 from leaving upper cam surface 144 as it is pulled down by lead screw 52. Spherical bearing 36 reacts an upward force from the lead screw 52 while spring 74 applies a radially directed force on coupler link 64. Cam follower 116 is not in contact with the drive cam 50 surface.

Figure 12B:
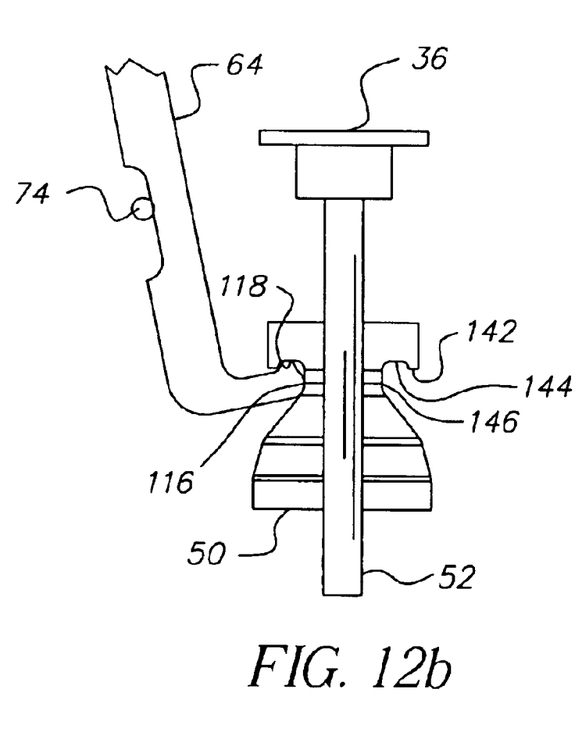

The second state is shown schematically in FIG. 12b where drive cam 50 has moved up on the lead screw 52 to a point where tab 118 is still in contact with upper cam surface 144 but has moved in radially from lip 142. Cam follower 116 is now in contact with the cylindrical surface 146 of the drive cam 50. Contact between coupler link 64 and cylindrical surface 146 is maintained by spring 74 only. A slight downward force is applied to the spherical bearing 36 by lead screw 52. The four bar linkage degenerates into a simple lever at this stage since the follower link 102 (not shown) is grounded to the latch core 26 (not shown).

Figure 12C:
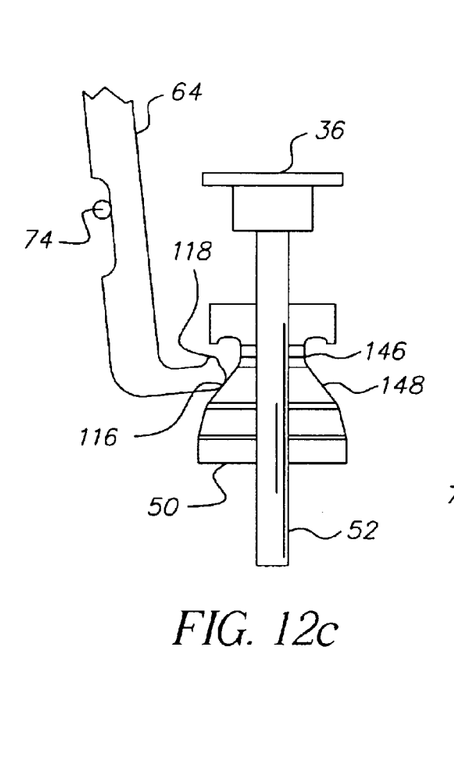

The third state is shown schematically in FIG. 12c where drive cam 50 moved up further along lead screw 52. Cam follower 116 has moved from the cylindrical surface 146 to the steep tapered surface 148 on drive cam 50, while tab 118 is no longer in contact with any surface. Spherical bearing 36 reacts only a light upward force and spring 74 maintains a radially directed force on coupler link 64. Pawls 18 (not shown) are closing on the clamp plate 30 (not shown) during this stage. When cam follower 116 reaches the end of the steep tapered surface 148, the pawls 18 (not shown) are in contact with the clamp plate 30 (not shown).

Figure 12D:
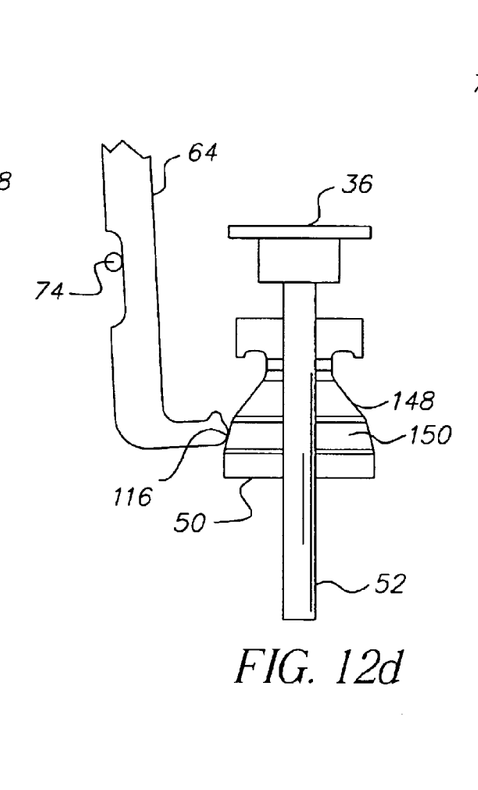

The fourth state is shown schematically in FIG. 12d where drive cam 50 has moved up further along lead screw 52 almost to its final position. Cam follower 116 has moved from the steep tapered surface 148 to a shallow tapered surface 150 on drive cam 50. Displacement due to the cam motion bends the coupler link 64 applying a high load on the clamp ring 30 (not shown). Spherical bearing 36 reacts a high downward force substantially greater than spring 74. When cam follower 116 reaches the end of the shallow tapered surface 150, the pawls 18 (not shown) generate the maximum force on clamp plate 30 (not shown). Use of a shallow taper gives a large mechanical advantage while clamping, thereby reducing the required motor torque for a desired clamping force. At this point, the stop projecting from the coupler link engages the latch core when the latch plate is fully captured and final clamping begins.

Figure 12E:
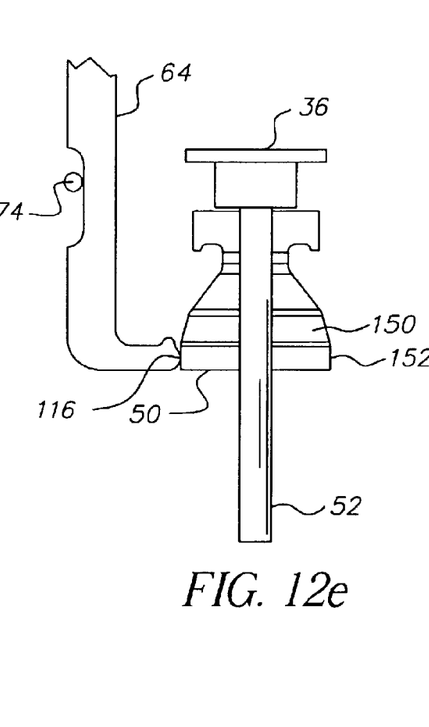

The final state is shown schematically in FIG. 12e where drive cam 50 has reached its final position on lead screw 52. Cam follower 116 has moved from the shallow tapered surface 150 to a lower cylindrical surface 152 on drive cam 50. No changes in reaction forces are seen since the coupler link 64 has experienced no further deflection on the lower cylindrical surface 152 than that seen at the end of the shallow tapered surface 150. This eliminates the need to have a precise stopping point for the motor and allows motor slip to occur with out changing the clamping force.

From the foregoing, it will be seen that this invention is one well adapted to obtain all of the ends and objects hereinabove set forth together with other advantages which are apparent and which are inherent to the apparatus.

It will be understood that certain features and sub-combinations are of utility and may be employed with reference to other features and sub-combinations. This is contemplated by and is within the scope of the claims.

As many possible embodiments may be made of the invention without departing from the scope thereof, it is to be understood that all matter herein set forth and shown in the accompanying drawings is to be interpreted as illustrative and not in a limiting sense.

Parts List 10 deployed member
12 flexured ball assembly
14 latch mechanism
16 reference structure
18 pawls
20 mounting plate
22 drive motor
24 main housing
26 latch core
28 ball seat
30 clamp plate
32 ball
34 spherical bearing assembly
36 spherical bearing
38 bearing clips
40 bearing housing
42 ball stem
44 axial bore
46 radial bore
48 lead screw/cam assembly
50 drive cam
52 lead screw
54 cam insert
56 lower cam stop
58 upper cam stop
60 cam stop pin
62 anti-rotation pins
64 couple links
66 end bore
68 drive shaft
70 drive motor
72 motor mount
74 spring element
76 acuating arms
80 flexured stem
82 cylindrical mounting shaft
84 clamp plate retaining flange
86 clamp plate centering shoulder
88 threaded shank
90 O-ring
92 diametrically located hole
94 clamp plate inner bore
96 clamp plate conical surface
100 linkage assembly
102 follower links
104 spaces
106 upper pivot pin
108 bores
112 lower pivot bore
114 kinematic stops
116 cam follower
118 tab
120 relief
122 main pivot pins
124 main pivot holes
126 axial bore
128 counter sunk screw holes
130 clearance
132 tapered holes
134 clearance slots
136 lower clearance slots
137 drive pin
138 groove
139 drive slot
140 flange
142 lip
144 upper cam surface

What is claimed is:

1. A latching device comprising:
(a) a latch core;
(b) at least one coupler link having a pawl at a first end thereof and a cam follower at a second end thereof, the at least one coupler link pivotally connected to a follower link, the follower link being pivotally connected to the latch core;

(c) a bearing housing affixed to the latch core;

(d) a spherical bearing residing in the bearing housing, the spherical bearing having a ball stem extending therefrom through the bearing housing;

(e) a lead screw connected to the ball stem;

(f) a drive cam threadably engaged on the lead screw, the cam follower engaging the drive cam;

(g) a motor to drive rotation of the lead screw to control travel of the cam on the lead screw thereby causing the at least one coupler link to move from an open position to a clamping position.

2. A latching device as recited in claim 1 wherein:

the drive cam includes a flange having an upper cam surface and a lip extending from the upper cam surface that prevents a tab projecting from the coupler link proximate to the cam follower from leaving the upper cam surface as the coupler link is pulled down by movement of the drive cam.

3. A latching device as recited in claim 2 wherein:

the drive cam includes a first cylindrical cam surface adjacent the upper cam surface, a first frusto-conical cam surface adjacent the first cylindrical cam surface, and a second frusto-conical cam surface adjacent the first frusto-conical cam surface, the coupler link moving to a partially closed position as the coupler link is pulled down by movement of the drive cam, the first frusto-conical cam surface being engaged by the cam follower when the drive cam is moved upwardly causing the pawl to move to a clamping position, the second frusto-conical cam surface being engaged by the cam follower when the drive cam is moved further upwardly causing a bending moment to be exerted on the coupler link.

4. A latching device as recited in claim 3 wherein:

the drive cam also includes a second cylindrical cam surface adjacent the second cylindrical cam surface, the second cylindrical cam surface being engaged by the cam follower as the drive cam continues upward motion thereby eliminating need to have a precise stopping point for the motor.

5. A latching device as recited in claim 3 further comprising:

a spring exerting a radially inwardly directed force on the at least one coupler link.

6. A latching device as recited in claim 3 further comprising:

a flexured ball assembly that is engaged by the pawl of the at least one coupler link when the coupler link is moved to the clamping position.

7. A latching device as recited in claim 6 wherein:

the flexured ball assembly includes a ball and a clamp plate, the ball engaging a ball seat in the latch core and the clamp plate being engaged by the at least one pawl to exert a downward force thereon when the coupler link is moved to the clamping position.

8. A latching device as recited in claim 7 wherein:

the follower link has a stop projecting therefrom that engages the latch core when the plate is fully captured and final clamping begins.

9. A latching device as recited in claim 3 further comprising:

a main housing having a mounting plate affixed thereto, the main housing providing residence for the latch core, the bearing housing, the drive cam and the lead screw, the at least one coupler extending through a respective slot in the main housing.

10. A latching device as recited in claim 3 wherein:

there are three coupler links.

11. A latching device as recited in claim 1 further comprising:

opposing bearing cups residing in the bearing housing.

12. A latching device as recited in claim 1 wherein:

there are three coupler links.

* * * * *